(12) United States Patent
Lahijani

(10) Patent No.: US 7,892,600 B2
(45) Date of Patent: Feb. 22, 2011

(54) ROTOLINING PROCESS

(75) Inventor: Jacob Lahijani, Wilmington, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 1052 days.

(21) Appl. No.: 10/719,973

(22) Filed: Nov. 21, 2003

(65) Prior Publication Data

US 2004/0137145 A1 Jul. 15, 2004

Related U.S. Application Data

(60) Provisional application No. 60/431,343, filed on Dec. 6, 2002.

(51) Int. Cl.
*B05D 7/22* (2006.01)
(52) U.S. Cl. .................................................... 427/231
(58) Field of Classification Search .................. 427/231
See application file for complete search history.

(56) References Cited

U.S. PATENT DOCUMENTS

| 4,316,836 | A |   | 2/1982  | Aufdermarsh, Jr. |         |
|-----------|---|---|---------|------------------|---------|
| 4,714,756 | A | * | 12/1987 | Buckmaster       | 528/481 |
| 4,897,439 | A | * | 1/1990  | Rau et al.       | 524/404 |
| 5,093,409 | A | * | 3/1992  | Buckmaster       | 524/544 |
| 5,397,831 | A | * | 3/1995  | Saito et al.     | 524/502 |
| 5,760,151 | A |   | 6/1998  | Aten et al.      |         |
| 5,981,673 | A |   | 11/1999 | DeSimone et al.  |         |
| 6,287,632 | B1| * | 9/2001  | Nishio et al.    | 427/183 |
| 6,624,269 | B2|   | 9/2003  | Wu et al.        |         |
| 6,632,902 | B2|   | 10/2003 | Lahijani         |         |
| 2002/0002248 | A1 | | 1/2002 | Hung et al.      |         |
| 2002/0011692 | A1 | | 1/2002 | Lahijani         |         |

FOREIGN PATENT DOCUMENTS

| EP | 0 226 668 B1 | 1/1992 |
| EP | 1 031 384 A2 | 8/2000 |
| JP | 09 169880 A  | 6/1997 |
| JP | 2904593 B2   | 6/1999 |
| JP | 2904596    * | 6/1999 |

OTHER PUBLICATIONS

John Scheirs, Modern Fluoropolymers, (1997), pp. 314-315, John Wiley & Sons, London.

* cited by examiner

*Primary Examiner*—David Turocy
*Assistant Examiner*—Robert Vetere

(57) ABSTRACT

The present invention relates to (a) the rotolining of the interior surface of a hollow article with tetrafluoroethylene/perfluoro(alkyl vinyl ether) copolymer in a multicoat system, in which the undercoat also contains a powder additive, and the overcoat is preferably stabilized copolymer to form a bubble-free coating thicker than the undercoat, (b) embodiments in which the undercoat is stabilized or unstabilized copolymer, (c) use of the undercoat as a single coat system, (d) the composition for forming a bubble-free coating that adheres to the surface, arising from the presence of adhesion-promoting, non-bubble promoting metal powder being present in the composition.

19 Claims, No Drawings

ROTOLINING PROCESS

BACKGROUND OF THE INVENTION

1. Field of the Invention

This invention relates to a process for rotolining with tetrafluoroethylene/perfluoro(alkyl vinyl ether) copolymer as the rotolining polymer and to rotolining compositions.

2. Description of Related Art

J. Scheirs, Modern Fluoropolymers, John Wiley & Sons (1997) describes the rotolining process, which involves the adding of sufficient fluoropolymer in powder form to a steel vessel to coat the interior surface of the vessel with the desired thickness of the fluoropolymer, followed by rotating the vessel in three dimensions in an oven, to melt the fluoropolymer, whereby the fluoropolymer covers the interior surface of the vessel and forms a seamless lining (p. 315). The resultant fluoropolymer lining protects the vessel from corrosive materials stored or handled by the vessel, by virtue of the chemical inertness of the fluoropolymer forming the lining and the lining being continuous with respect to the interior surface of the vessel that would be exposed to the corrosive materials if the lining were not present. Thus, the lining is free of holes, even pinholes, through which the corrosive material could penetrate the lining to attack the material of construction of the vessel.

J. Scheirs also clarifies the relationship between the vessel and the fluoropolymer lining. For some fluoropolymers, notably copolymer of ethylene with either tetrafluoroethylene (ETFE) or chlorotrifluoroethylene (ECTFE) and polyvinylidene fluoride (PVDF), the lining adheres to the interior surface of the vessel, while for the perfluorinated melt processible polymers, tetrafluoroethylene/hexafluoropropylene (FEP) and tetrafluoroethylene/perfluoro(alkyl vinyl ether) (PFA), such polymers form only a loose lining within the vessel (p. 314). The PFA available for rotolining has been tetrafluoroethylene/perfluoro(propyl vinyl ether). The loose lining is held in place by the configuration of the interior surface of the vessel, i.e. mechanically locked into place, to provide the necessary protection to the vessel. The reason why the lining is loose arises from the high shrinkage of the perfluorinated polymer when the lined vessel is cooled from the rotolining operation, the shrinkage of PFA even exceeding that of FEP, causing the lining to separate from the interior surface of the vessel. While this is satisfactory in some applications, the lack of adhesion between lining and interior surface of the vessel becomes disadvantageous in such vessels as pipes, wherein the opportunity for mechanical restraint on movement of the lining is limited, especially as the length of the pipe increases. The passage of corrosive material, such as oil through the pipe, especially when the flow and/or temperature of the material varies, subjects the lining to mechanical stress, which can cause the lining to crack and fail.

Japanese Patent 2904593, first published as Kokai H4-267744 on Sep. 24, 1992, discloses the rotolining of a vessel using PFA which bubbles during rotolining and solves the bubbling problem by adding from 0.1 to 30 wt % of a fine powder, disclosing inorganic powder or metal powder such as glass, silicon, zinc, aluminum, copper or the like, to the PFA. The preferred amount of fine powder is 5 wt %, and the resultant lining is 2.0 mm (80 mils) thick. No effect on adhesion of the rotolined coating is disclosed. The effect of the fine powder is disclosed, however, viz. to cause the bubbles to adhere to the freely moving fine powder particles so as to be released to the outside, whereby the gas bubbles do not remain in the coating. The patent discloses that the presence of the fine powder, however, causes another problem, namely that the fine powder can deposit on the surface of the coating to become a contaminant in the chemical stored in the vessel. The patent solves this problem by applying a rotolined second layer onto the lining (first layer), with the second layer being free of fine powder. The second layer is kept thinner than the first layer so that the formation of bubbles in the second layer is small, and the thickness of the second layer is disclosed to be 0.5-1.0 mm (20-40 mils).

Just as the first layer in the Japanese patent must be thick enough to insure that the underlying interior surface of the vessel is protected from the chemical stored in the vessel, so must the second layer be thick enough to insure that the chemical stored in the vessel does not come into contact with the fine powder present in the first layer. Unfortunately, a 1.0 mm second layer thickness is too thin to insure that the first layer is completely covered by the second layer. Rotolinings are typically uneven in thickness, because the uniformity of the deposition of the PFA powder on the surface being coated is uncontrollable.

The problems of preventing additives to the PFA first layer (undercoat) from escaping to the interior of the rotolined article and adhering the PFA rotolining to the interior surface of the article being lined remain to be solved.

BRIEF SUMMARY OF THE INVENTION

It was noted above that the lining must be free of holes in order to fulfill its protective role. Accordingly, the lining must be free of bubbles, which form voids in the lining. Bubbles also have the disadvantage of forming irregularities in the surface of the lining (facing the corrosive material), which cause irregularities in flow of the corrosive material and points of entrapment of the corrosive material by the lining, to cause contamination in later process flows through the lining. The present invention uses stabilized tetrafluoroethylene/perfluoro(alkyl vinyl ether) copolymer (PFA) that does not form bubbles under rotolining conditions. There are several ways of stabilizing the copolymer, including the conversion of unstable end groups to stable end groups. One such method is described in EP 0 226 668 B1, wherein PFA copolymer granules (particles) are subjected to fluorine treatment, which converts unstable end groups of the copolymer, in particular —COOH, —CONH$_2$, —CH$_2$OH, —CO$_2$CH$_3$, —CF=CF$_2$, and —COF end groups to the most stable end group —CF$_3$, with the resultant fluorinated copolymer having less than 80 unstable end groups (in total) per $10^6$ carbon atoms. The instability of the unstable end groups manifests itself by decomposition to volatile products, such as HF and CO$_2$, during the heating involved in melting the copolymer in order to form the rotolining, these volatile products forming bubbles in the lining. Example 2 of EP'688 discloses that the stabilized (fluorinated) copolymer gives bubble-free linings, while the unfluorinated copolymer gives linings with bubbles and lumps, the lumps being encapsulated bubbles projecting above the lining surface, with the encapsulation being subject to rupture, thereby forming holes in the lining. Unfortunately, the lining of stabilized PFA does not adhere to the surface on which it is applied, and is maintained in place only by the geometry of the lined surface forming a mechanical engagement with the PFA lining.

The present invention provides a single-coat PFA rotolining that is both bubble-free and adherent to the surface being rotolined, and an adherent, bubble-free multicoat PFA rotolining.

With respect to the multicoat embodiment, the present invention involves the use of stabilized tetrafluoroethylene/perfluoro(alkyl vinyl ether) copolymer as the overcoat on an undercoat of tetrafluoroethylene/perfluoro(alkyl vinyl ether) copolymer that contains a powder additive. Thus, this embodiment can be described as a process comprising rotolining the interior surface of a hollow article with a composition comprising particles of tetrafluoroethylene/perfluoro(alkyl vinyl ether) copolymer and adhesion-promoting powder additive to form an adherent bubble-free undercoat on said interior surface and forming a rotolined bubble-free overcoat of tetrafluoroethylene/perfluoro(alkyl vinyl ether) copolymer on said undercoat, said copolymer forming said overcoat being stabilized copolymer and the thickness of said overcoat being at least about ⅔ the thickness of the undercoat. The copolymer forming the undercoat is preferably stabilized, but unstabilized tetrafluoroethylene/perfluoro(methyl vinyl ether)/perfluoro(propyl vinyl ether) copolymer can be used, and the powder additive prevents this unstable copolymer from generating bubbles during rotolining. Preferably the thickness of the overcoat is greater than the thickness of the undercoat. Most preferably the thickness of the overcoat is at least about 1.5 mm (60 mils). Use of the stabilized tetrafluoroethylene/perfluoro(alkyl vinyl ether) enables thick overcoats of PFA to be formed to prevent the powder in the undercoat from contaminating fluid contained in the hollow article.

Still another embodiment of the present invention involves the use of the stabilized PFA as a single rotolining coating (lining), whereby it is unnecessary to add powder to this PFA for the purpose of preventing the formation of bubbles in the undercoat as it is formed from the PFA powder by the rotolining process. This embodiment can be described as a process comprising adding a composition comprising particles of stabilized tetrafluoroethylene/perfluoro(alkyl vinyl ether) copolymer and adhesion promoting, non-bubble forming powder to the interior of a hollow article, rotating said article to distribute the composition over said interior surface, heating said article while it is rotating to melt said copolymer particles to form a continuous lining comprising said copolymer and said powder adhering to said interior surface, and cooling said article. Such lining is both bubble free and smooth and adherent to the interior surface of the article being so-rotolined by virtue of the powder present in the rotolining composition. The absence of bubbles from the stabilized PFA during the rotolining process means that that the powder is not occupied in carrying the bubbles to the surface of the coating. Instead, the powder provides the unique function of causing the coating to adhere to the interior surface of the article. Examples of such preferred powders are such metal powders as powder that provide this adhesion result are zinc, copper, and tin and combinations thereof. These metal powders do not themselves cause bubbling in the coating. Both aluminum and aluminum oxide powders cause bubbling in the coating, even when the PFA is stabilized. The amount of adhesion-promoting, non-bubble forming powder, including metal powder, present in said composition is small, being less than about 5 wt %. Maximum adhesion is generally achieved using no more than about 2 wt % of the powder, there being no advantage in using more powder than required for the adhesion to be achieved. Greater amounts of powder have the disadvantage of being a contaminant and of deteriorating the toughness of the coating. Surprisingly, these powders in small amounts cause the lining to adhere to the interior surface of the article being rotolined. This embodiment of the present invention can be used in combination with the first embodiment described above to form a multicoat lining.

The above-described single-coat rotolining process can also be practiced with unstabilized tetrafluoroethylene/perfluoro(methyl vinyl ether)/perfluoro(propyl vinyl ether) copolymer, wherein the bubbles that would otherwise form in the rotolining process are prevented by the presence of the powder.

Another embodiment of the present invention is the composition used to obtain the bubble-free, adherent rotolined coating said composition comprising particles of stabilized tetrafluoroethylene/perfluoro(alkyl vinyl ether) copolymer and adhesion promoting, non-bubble promoting powder and particles of unstabilized tetrafluoroethylene/perfluoro(methyl vinyl ether)/perfluoro(propyl vinyl ether) copolymer and adhesion-promoting, non-bubble forming powder. This composition can be used to form a single layer coating or as the undercoating in the first embodiment described above. Another aspect of the present invention is the composition of the lining (coating, film, or sheet) formed from the composition of the present invention by melting and cooling of the composition (copolymer) such as by the rotolining process described above.

DETAILED DESCRIPTION OF THE INVENTION

The process steps of rotolining are conventional as is the use of particles of stabilized tetrafluoroethylene/perfluoro(alkyl vinyl ether) copolymer by itself as the rotolining material for single coat application. Thus, it is understood that the hollow interior of the article is sealed after the copolymer is added thereto and prior to the start of the rotation step. Typically the interior surface of the hollow article being lined will be made of steel, such as carbon steel or stainless steel.

The present invention resides in the compositions used in rotolining and/or particular rotolined layers formed therefrom or in the combination of layers produced by rotolining. The steps of rotolining and the stabilized copolymer disclosed in EP 0 226 668 B1 as a single layer coating can be used. In this publication the particles of copolymer are prepared by solvent aided-pelletization, which involves forming a gel of an aqueous dispersion of the copolymer, mechanically agitating the gel in the presence of water immiscible liquid to form granules, followed by drying the granules. The resultant granules have an average particle size of 200 to 3000 μm and have a substantially spherical shape as indicated by a sphere factor of less than 1.5. The particles of copolymer used in the present invention, whether used as a single coat, undercoat or overcoat, can be prepared in the manner disclosed in this publication, with the resultant granules having the same particle size and spherical shape as described therein, with these characteristics being determined as disclosed in the publication. The copolymer particles for any of these coatings can also be made by other processes, for example the melt extrusion of the copolymer and cutting of the extrudate into minicubes as disclosed in U.S. Pat. No. 6,632,902, wherein the average particle size of the cubes is 200 to 1200 μm. Thus, the average particle size of the copolymer particles used in the present invention is preferably about 100 to 3000 μm, more preferably about 400 to 1100 μm.

The copolymer particles can also be heat hardened, by heating the particles to a temperature below the onset of melting, so as to avoid melting of the particles, for a sufficient time to harden the particles so as to be free flowing. The heat hardening is characterized by the particles exhibiting an attrition factor of at least 60 as disclosed in EP'668.

The copolymer itself will typically be made by aqueous dispersion copolymerization of tetrafluoroethylene with perfluoro(alkyl vinyl ether), wherein the alkyl group contains 1 to 8 carbon atoms, preferably 1 to 3 carbon atoms. The vinyl ether comonomer can be a one or more vinyl ethers. The resultant copolymer is formed as fine particles in the aqueous dispersion medium, these fine particles having an average particle size of about 0.2 µm, which is often called the primary particle size. The copolymer particles used in the process of the present invention are generally secondary particles in the sense of being agglomerates of primary particles when prepared by the pelletizing process of EP 0 226 668 When the particles are made by extrusion/cutting, they too are larger than the original primary particles.

The copolymer will typically contain about 0.4 to 10 mole % of the vinyl ether comonomer, the remainder being tetrafluoroethylene units, and can contain small amounts of other comonomers, less than the molar amount of vinyl ether comonomer, if desired. Examples of such copolymers are copolymers of tetrafluoroethylene with perfluoro(methyl vinyl ether) (PMVE) and perfluoro(propyl vinyl ether) (PPVE), sometimes referred to as MFA, and copolymers of tetrafluoroethylene with perfluoro(ethyl vinyl ether) (PEVE) or PPVE. MFA is described in the literature as a tetrafluoroethylene-based perfluoropolymer in which the main comonomer is perfluoro(methyl vinyl ether) (J. Scheirs, Modern Fluoropolymers, published by John Wiley & Sons (1997) on p. 376). U.S. Pat. No. 6,624,269 discloses additional compositional information on MFA, namely that the additional comonomer is PPVE, and disclosing the following composition for MFA: copolymer of TFE, 0.5 to 13 wt % PMVE, and 0.5 to 3 wt % PPVE. The manufacturer of tetrafluoroethylene/perfluoro(methyl vinyl ether)/perfluoro(propyl vinyl ether) copolymer called this copolymer MFA when it was introduced, apparently to distinguish this copolymer from PFA. Very recently, however, the manufacturer has called MFA a species of PFA, and that interpretation, i.e. that PFA includes MFA, is adopted for the purpose of this patent application.

The tetrafluoroethylene/perfluoro(alkyl vinyl ether) copolymer will also typically exhibit a melt flow rate (MFR) at 372° C. of about 1 to 50 g/10 min, as determined by the procedure disclosed in ASTM D 3307, more preferably about 2 to 30 g/10 min. The copolymer is of course melt processable as indicated by it having an MFR. Copolymers having these MFR exhibit adequate flow in the molten state to convert the copolymer particles to a continuous lining and for the lining to have sufficient toughness to withstand the thermal and mechanical shocks associated with the use of the rotolined article. The copolymer may be partially crystalline or amorphous. Preferably the copolymer is partially crystalline. By partially crystalline is meant that the polymers have some crystallinity and are characterized by a detectable melting point measured according to ASTM D 3418, and a melting endotherm of at least about 3 J/g. Melt-processible polymers that are not crystalline according to the preceding definition are amorphous. Amorphous polymers include elastomers, which are distinguished by having a glass transition temperature of less than about 20° C. as measured according to ASTM D 3418.

The above-described PFA copolymers, whether stabilized or not, are the basic fluoropolymers used in the single layer, undercoat, and overcoat (stabilized copolymer) rotolining compositions used in the present invention. TFE/PPVE copolymer has a melting temperature of about 305° C., TFE/PEVE copolymer has a melting temperature of about 280° C., and TFE/PMVE/PPVE copolymer has a melting temperature of about 270° C. The undercoat and overcoat copolymers can be the same or different. In the latter case, however, it is desired that the melting temperature of the copolymer in the overcoat be no greater than in the undercoat With respect to the stabilization of unstable PFA copolymers, as described in EP 0 226 668, many of the copolymers described herein have unstable end groups which on heating can decompose to volatile product, such as $CO_2$ and HF, which cause bubbles and voids in rotolinings. In this publication, the copolymer is stabilized by exposing the copolymer particles to fluorine for a sufficient time to reduce the unstable end group population in the copolymer to be less than about $80/10^6$ carbon atoms present in the copolymer. This fluorine treatment can be used on the copolymer particles used in the present invention to reach the same endpoint, the sum of these end groups being less than about 80 unstable end groups/$10^6$ carbon atoms, preferably less than about 50, more preferably, less than about 10, and even more preferably less than about 3 unstable end groups/$10^6$ carbon atoms. By "unstable end groups" is meant —COOH, —CONH$_2$, —CH$_2$OH, —CO$_2$CH$_3$, —CF=CF$_2$, and —COF. The exposure of these end groups to fluorine converts these unstable end groups to the very stable —CF$_3$ end groups. The analysis for unstable end groups is disclosed in EP 0 226 688. MFA, which contains the —CF$_2$H end group, has an intermediate level of stability. Such copolymer by itself used as the rotolining on the interior surface of the hollow article will bubble during formation of the coating, but such copolymer is capable of forming a bubble-free rotolined overcoat if care is taken in selecting the rotolining temperature and rotolining time (layer thickness) such that the copolymer does not degrade. MFA copolymer containing the —CF$_2$H end group in place of the unstable end groups described above, such that the copolymer has less than 80 of such end groups/$10^6$ carbon atoms, are nevertheless considered to be unstable with respect to the single layer or undercoat aspects of the present invention, i.e. the copolymer by itself forms bubbles during rotolining, but stable with respect to the overcoat layer aspect of the present invention.

The stability of the copolymer can also be characterized by it being non-bubbling in the rotolining process to form a smooth bubble-free single coat, undercoat, or overcoat as the case may be. By smooth is meant that craters or voids or lumps are not present at the surface of the lining. Lumps are encapsulated bubbles that protrude from the exposed surface of the lining. The absence of voids also indicates that the lining forms a continuous coating on the interior surface of the hollow article being rotolined. By bubble-free is meant that bubbles are not visible with the naked eye in the lining and the residue of bubbles, such as voids or craters, are not visible either. The stability requirement for the rotolining in contact with the interior surface of the hollow article is greater than for the overcoat. The contact between the molten fluoropolymer with the interior surface promotes the formation of bubbles, in the absence of stabilization of the fluoropolymer. Since the overcoat does not contact the interior surface, this source of bubble promotion is not present. While unstabilized TFE/PPVE copolymer overcoat will nevertheless bubble at the usual overcoat thickness of at least 1.3 mm (50 mil), the TFE/PMVE/PPVE copolymer can form bubble-free overcoats by not heating the copolymer to high for too long, without having the predominant end group be —CF$_3$, especially if it has —CF$_2$H end groups instead. The overcoat is preferably formed from stabilized PFA, however, to provide greater processing latitude.

The stabilization of the copolymer to achieve the smooth bubble-free rotolining result can be obtained by methods other than fluorine treatment or other end group stabilization treatment of the copolymer after recovery from polymerization and being formed into particles. For example the copolymer can be stabilized as formed in the copolymerization process, such as by the polymerization process disclosed in U.S. Pat. No. 5,981,673, wherein the copolymer as-formed, is formed with such stable end groups as perfluoroalkyl, perfluoroalkoxy, or perchloroalkyl.

In accordance with the first embodiment of the present invention, stabilized tetrafluoroethylene/perfluoro(alkyl vinyl ether) copolymer is used as the overcoat over a tetrafluoroethylene/perfluoro(alkyl vinyl ether) copolymer undercoat containing a powder additive, with the overcoating (formation of the topcoat) being carried out using a stabilized tetrafluoroethylene/perfluoro(alkyl vinyl ether) copolymer by itself, i.e. without having powder additive present. The alkyl group in each copolymer can contain 1 to 8 carbon atoms, preferably 1 to 3, and the vinyl ether comonomer can be one or more of such comonomers. The copolymer can be the same as the copolymer used in the lining (undercoat) or can be different. The role of the overcoat is to complete the lining thickness desired to protect the interior surface of the hollow article from the fluid contained (passing through or maintained within) in the hollow article, while shielding the contents of the rotolined article from the powder additive in the undercoat. The powder additive can be any non-bubble forming material in finely divided form that is dispersed in the copolymer undercoat, such material being discrete within and releasable from the undercoat, i.e. the powder does not adhere to the copolymer of the undercoat. The overcoat as a topcoat presents pure, chemically inert copolymer to the processed fluid. The overcoat can be applied by the same rotolining process used to form the lining (undercoat), after the undercoat has cooled, i.e. the particles of stabilized copolymer are added to the interior of the already-lined hollow article and the hollow article is re-heated and rotated within the oven to cause the copolymer particles charged into the hollow interior of the article to form a stabilized coating over the PFA copolymer/powder additive lining.

As stated above, preferably, the thickness of the overcoat is greater than the thickness of the undercoat. The undercoat adheres to the interior surface of the hollow article, and the overcoat, being polymerically similar to the undercoat, adheres to the undercoat, thereby forming a thick adherent tetrafluoroethylene/perfluoro(alkyl vinyl ether) copolymer overall coating on the interior surface of the hollow article. It is preferred that the overcoat has a thickness of at least about 0.75 mm (30 mils), more preferably at least about 1.5 mm (60 mils), and even more preferably at least about 2.5 mm (100 mils), and that the overall coating, undercoat plus overcoat, has a thickness of at least about 2.25 mm (90 mils), preferably at least about 2.75 mm (110 mils) and even more preferably, at least about 4 mm (160 mils). The overcoating may be thicker, e.g. up to about 100 mm (4000 mils), and the overall layer thickness can also be thicker, e.g. up to about 125 mm (5000 mils).

The undercoat is also a copolymer of tetrafluoroethylene/(perfluoro(alkyl vinyl ether). The alkyl group can contain 1 to 8 carbon atoms, preferably 1 to 3, and the vinyl ether comonomer can be one or more of such comonomers. The copolymer can be the same as or different from the copolymer used in the overcoat. The copolymer in the undercoat is preferably stabilized, i.e. capable of forming a bubble-free lining without the powder being present. As previously discussed, the stabilization can be described in terms of the end group result of the stabilization treatment, e.g. the copolymer containing less than 80 unstable end groups/$10^6$ carbon atoms as compared to the as-polymerized copolymer which will contain a total of at least about 400 unstable end groups/$10^6$ carbon atoms, which is the result of polymerization carried out using an inorganic salt, such as potassium persulfate, to form a copolymer characterized by the MFR described above. For the purposes of simplicity, copolymer having at least about 80 unstable end groups (in total)/$10^6$ carbon atoms is considered as being unstabilized.

The undercoat is made to adhere to the interior surface of the hollow article by the copolymer being used to form the undercoating being a composition comprising the copolymer and adhesion promoting, non-bubble promoting powder. Such powder can be the powder additive described above. Preferred powders are such metal powders as zinc, tin, or copper or a combination thereof. Examples of combinations of the metal powders are physical mixtures and alloys thereof. Examples of alloys include Zn/Cu (brass) and Cu/Sn (bronze). These powders can also prevent the MFA copolymer from bubbling when precautions are taken not to heat this copolymer for too high a temperature for too long. Some powder additives, such as aluminum or aluminum oxide cause bubbling in the rotolining composition during the rotolining process, and are therefore unsuitable. The powder component of the rotolining composition typically has a particle size of no greater than about 100 µm, preferably less than about 60 µm. It is unnecessary for the powder particles to be less than about 1 µm. Consequently at least about 75 wt % and preferably at least about 90 wt % of the particles of powder will be from about 1 to 100 µm in size. The powder can simply be mixed with the particles of stabilized copolymer or unstabilized MFA to form the composition added to the interior of the hollow article to be rotolined. The mixing of the powder with the copolymer is done after the fluorination treatment, when used, so that the fluorine does not react with the powder.

The melt density of the tetrafluoroethylene/perfluoro(alkyl vinyl ether) copolymer is about 1.74 g/cc and the density of the copolymer after cooling to room temperature is about 2.15 g/cc, regardless whether the copolymer is stabilized or not. This large difference in densities between the molten and solid states indicates a large shrinkage upon cooling the rotolining from the melt, which is why the copolymer lining does not adhere to the interior surface of the hollow article even when the interior surface is roughened such as by grit blasting. Surprisingly, the small amount of powder intermixed with the copolymer is sufficient to cause the lining to adhere to the interior surface, preferably achieving a peel strength of at least about 25 lb/in (4.4 kN/m). The amount of such powder is about at least about 0.2 wt %, preferably 0.3 to 1.2 wt %, more preferably about 0.4 to 1.0 wt %. Weight %s disclosed herein are based on the total weight of the copolymer/powder composition. Too little of the amount of powder does not give the adhesion desired, and as the amount of powder exceeds about 1.2 wt %, no further appreciable improvement in adhesion is obtained. Instead, adhesion diminishes and the toughness of the undercoat diminishes as well. The intermixture of the copolymer and powder forming the rotolining composition is retained in the resultant rotolining, i.e. the lining is a dispersion of the powder in the copolymer forming the lining.

The undercoat can have a thickness of at least about 0.75 mm (30 mils), preferably at least about 1.25 mm (50 mils), and even up to about 25 mm (1000 mils), although thicknesses of about 1.25-2.5 mm (50 to 100 mils) are preferred. The thickness of the lining is the thickness of the thinnest point of the lining. Interior surfaces to be rotolined that have planar surfaces tend to receive rotolinings with thinner regions near the center of the planar surface, while cylindrical interior surfaces tend to receive rotolinings of uniform thickness.

When the copolymer forming the undercoat is stabilized copolymer, the powder additive serves the sole purpose of causing the adhesion to occur. When the copolymer is unstabilized MFA, the powder serves the additional purpose of preventing the MFA from bubbling during rotolining.

Another aspect of the present invention is the use of the preferred stabilized copolymer/powder composition to form a single layer rotolining coating, i.e. no overcoat is present. This single layer is useful in many rotolining applications because there are no gas bubbles forming in the coating during rotolining for transporting the powder to the surface of the coating, and moreover, the concentration of the powder in the composition is very low, thereby minimizing the possibility of contamination of fluid contained in the rotolined article.

EXAMPLES

In the following Examples, the fluoropolymer used is commercially available tetrafluoroethylene/perfluoro(propyl vinyl ether) copolymer exhibiting a melt flow rate of 6 g/10 min. The copolymer is in the form of particles having an average particle size of 475 μm. These particles, unless otherwise indicated, are fluorine treated to form a stabilized copolymer having less than 10 unstable end groups/$10^6$ carbon atoms. When metal powder is used, such powder has the fineness of talcum powder in which at least about 90 wt % of the powder particles have a particle size in the range of 2 to 40 μm. The rotolining composition used in the Examples is prepared by dry mixing copolymer particles with the metal powder in the amount desired. The resultant composition (mixture) is added to the mold to be rotolined in the amount to obtain the lining thickness desired. The mold is in the form of a flat rectangular box resembling a book, in which two major opposing interior surfaces are the test panels of substrate to be lined, and the remaining minor interior surfaces comprise the frame holding the two test panels in place and forming the enclosure required for the rotolining to occur. The mold is rotated on multiple axes while present in an air oven supplying the heat necessary to melt the copolymer particles, resulting in the interior surface of the mold, including the two test panels, becoming lined with the composition. Upon completion of the rotolining process, the oven is cooled and the rotolined test panels are separated from the mold for observation of the quality of the rotolining. When the rotolining on the test panels has the appearance of adhesion, i.e. the lining is adhered to the edges of the test panel and the test panel is bowed by virtue of the lining shrinking more than the test panel during the cooling of the mold, the peel strength of the adhesion of the lining on the test panel is determined in accordance with the procedure of ASTM D 413. The bubble-free quality of the lining is determined by observation of the lining with the naked eye. The lining is considered bubble free when no bubbles are visible within the lining thickness and the surface of the lining is smooth, i.e. free of voids, lumps, and craters.

The process of the present invention can be used in general for rotolining the interior surface of hollow articles and wherein the interior surface can be made of a variety of different materials, such as carbon steel and stainless steel. The fact the present invention causes the lining to adhere to the interior surface, makes the practice of the present invention particularly valuable for lining pipe, including tubing. For pipe, the only mechanical interconnection between the lining and the pipe is the flanges at each end of the pipe. The longer the pipe between flanges, the greater is the mechanical stress imposed on the lining due to mechanical action of fluid or temperature change, especially rapid or abrupt temperature change, which can be injurious to the integrity of the lining when not adhered to the pipe interior surface. Flexure of the lining independent of the pipe interior surface can cause the lining to crack. Adhesion of the lining to the interior surface of the hollow article in general and to the interior surface of pipe in particular strengthens the lining, thereby maintaining its integrity and prolonging its life.

Example 1

A series of rotolinings are conducted at oven temperature of 720° F. (382° C.) for 120 min of mold rotation, in which the test panels are 1018 carbon steel which have been grit blasted with a blend (16 grit) of alumina particles and glass beads and in which the amount of rotolining material added to the mold is sufficient to form a lining 90 mils (2.3 mm) thick.

When the rotolining material consists solely of the stabilized copolymer, free of any powder, the resulting smooth bubble-free lining separates from the grit blasted steel surface upon cooling of the mold and test panels therein.

When the rotolining material is a composition of the stabilized copolymer and 0.5 wt % Zn, the resulting bubble free lining exhibits a peel strength on the test panel of 68.5 lb/in (12.1 kN/m). Repetition of this process but using 304 stainless steel as the test panel, grit blasted in the same way as the 1018 steel test panel, the resulting smooth bubble-free lining exhibits a peel strength of 44.6 lb/in (7.8 kN/m).

The same rotolining procedure is used to apply an overcoat of the same stabilized copolymer over these rotolined undercoats, to a thickness of 2.25 mm (90 mils). The overcoats are bubble-free.

Example 2

A series of rotolinings are conducted at different oven temperatures for 120 min of mold rotation, in which the test panels have been grit blasted with the blast media blend described in Example 1, and the composition is the stabilized copolymer and 0.5 wt % Zn to make a lining 90 mils (2.3 mm) thick.

When the oven temperature is 690° F. (365° C.), the resulting smooth bubble free lining on 1018 carbon steel test panels exhibits a peel strength of 54.1 lb/in (9.5 kN/m). When the test panels are 304 stainless steel, the peel strength of the smooth bubble-free lining is 29.5 lb/in (5.17 kN/m).

When the oven temperature is 700° F. (371° C.), the resultant smooth bubble-free lining exhibits a peel strength of 66.6 lb/in (11.7 kN/m) on 1018 carbon steel test panels. When the test panels are 304 stainless steel, the resultant smooth bubble-free lining exhibits a peel strength of 37.5 lb/in (6.56 kN/m).

When the oven temperature is 710° F. (377° C.), the resulting smooth bubble-free lining exhibits a peel strength of 71 lb/in (12.4 kN/m) on 1018 carbon steel test panels and 43.5 lb/in (7.6 kN/m) on 304 stainless steel test panels.

The same rotolining procedure is used to apply an overcoat of the same stabilized copolymer over these rotolined undercoats, to a thickness of 3 mm (120 mils). The overcoats are bubble-free.

Example 3

A series of rotolinings are conducted at the oven temperature of 680° F. (360° C.) for 120 min of mold rotation, in which the test panels have been grit blasted with the blast media blend described in Example 1, and the composition is the stabilized copolymer and different amounts of Zn to make smooth bubble free linings 90 mils (2.3 mm) thick.

When the amount of Zn in the composition is 0.5 wt %, the peel strength of the lining on 1018 carbon steel test panels is 43.4 lb/in (7.6 kN/m). When the amount of Zn is increased to 0.8 wt % and then to 1.1 wt %, the peel strengths are 42.6 and 37.2 lb/in (7.5 and 6.5 kN/m), respectively.

When the amount of rotolining composition is decreased to produce smooth bubble free linings 50 mils (1.25 mm) thick, the peel strength of the linings at 0.5 wt %, 0.8 wt % and 1.1 wt % Zn in the composition is 34.5, 38.0, and 35.4 lb/in (6.0, 6.7, and 6.2 kN/m), respectively.

Example 4

A series of rotolinings are conducted at an oven temperature of 710° F. (377° C.) for 120 min of mold rotation, in which the 1018 carbon steel test panels are blasted with 24 grit blasting media and the composition contains either 0.5 wt % Zn, 0.5 wt % Sn, or 0.5 wt % Cu. The resulting 90 mil (2.3 mm) thick linings are bubble free and smooth and the adhesion of the Sn- and Cu-containing composition linings compare favorably with that of the Zn-containing lining.

When these rotolinings are repeated using 0.5 wt % and 1 wt % aluminum metal powder or powdered aluminum oxide together with the stabilized copolymer to form the rotolining composition, the resultant linings contain bubbles, making the linings unsuitable for their protective purpose.

Example 5

A series of rotolinings are conducted using 740° C. as the oven temperature and two hours as the mold rotation time in the hot oven and using different copolymers of tetrafluoroethylene/perfluoro(alkyl vinyl ethers) and zinc as the powder metal additive. The stabilized copolymer used in the preceding Examples is used in this series of rotolinings as copolymer A. The same copolymer powder, but unstabilized, i.e. no fluorine treatment, is also used as copolymer B. Copolymer C is an unstabilized copolymer of tetrafluoroethylene and perfluoro(ethyl vinyl ether) having an MFR of 15 g/10 min, the particles of which have an average particle size of 1000 μm. Copolymer D is unstabilized MFA copolymer (copolymer of tetrafluoroethylene and perfluoro(methyl vinyl ether)) having an MFR of 6 g/10 min and average particle size of 475 μm. The rotolining coating thickness is 90 mil (2.3 mm) for each copolymer. All of the linings are bubble-free and smooth and are adhered to the stainless steel panels, giving the following peel strengths:

|           | Peel Strength (lb/in/kN/m) | |
| --------- | ----------- | ----------- |
| Copolymer | 0.5 wt % Zn | 1.0 wt % Zn |
| A | 41.5/7.26 | 28.35/4.96 |
| B | 43.7/7.65 | 47.07/8.24 |
| C | 77.4/13.55 | 92.37/16.16 |
| D | 32.6/5.71 | 31.31/5.48 |

These results show that increasing the Zn content in the copolymer from 0.5 wt % to 1 wt % generally has little effect on peel strength. Where the greatest increase in peel strength is obtained, copolymer C, the peel strength falls to 62.4 lb/in (10.92 kN/m) at 2 wt % Zn concentration in the copolymer. For copolymer B the peel strength also diminishes with increasing Zn concentration; at 2 wt % Zn concentration in the copolymer, the peel strength is 43.47 lb/in (7.60 kN/m).

These results also show that unstabilized copolymer (copolymer B) has better adhesion to the substrate than the stabilized copolymer (copolymer A). These results further show that the perfluoro(ethyl vinyl ether)-containing copolymer (copolymer C) exhibits the best peel strength.

Example 6

A series of rotolinings are made using MFA copolymer, copolymer D of Example 5, in which the rotolining temperature is 720° F. and the rotolining time is 2 hr to form rotolining thickness of 90 mils (2.3 mm), using test panels of grit blasted (16 grit) steel. When the MFA is used as is, i.e. contains no powder additive, the coating has no peel strength. It simply falls off the surface of the test panel. When 1 wt % zinc powder is added to the MFA, the resultant coating exhibits a peel strength of 36.5 lb/in (6.5 kN/m). When the zinc powder concentration is increased to 3 wt %, the resultant coating exhibits a peel strength of 18 lb/in (3.2 kN/m). The same MFA copolymer but without any powder additive is used to form a 50 mil thick topcoat (by rotolining technique) over the zinc-containing MFA copolymer underlayers, with the result being a bubble-free topcoat having a smooth surface.

What is claimed is:

1. Process for rotolining the steel interior surface of a hollow article, comprising, adding a composition consisting essentially of particles of fluorine treatment stabilized tetrafluoroethylene-perfluoro(alkyl vinyl ether) copolymer and adhesion-promoting, non-bubble promoting metal powder to the interior of said hollow article, said metal powder constituting no greater than about 2 wt % of said composition, rotating said article to distribute the composition over said interior surface, heating said article while it is rotating to melt said copolymer particles to form a continuous bubble-free lining comprising said copolymer and said metal powder on said interior surface, and cooling said article, and obtaining as a result thereof said bubble-free lining adhering to said steel interior surface, said adhering being characterized by a peel strength of at least about 25 lb/in, said copolymer being bubble-free when subjected to said rotolining by itself, said composition being formed after the preparation of said fluorine treatment stabilized tetrafluoroethylene-perfluoro(alkyl vinyl ether) copolymer.

2. Process of claim 1 wherein said metal powder is zinc.

3. Process of claim 1 wherein said metal powder contains tin.

4. Process of claim 1 wherein said metal powder contains copper.

5. Process of claim 1 wherein said metal powder is a combination of metals.

6. Process of claim 1 wherein said stabilized copolymer has less than about 80 unstable end groups/$10^6$ carbon atoms in said copolymer.

7. The process of claim 6 wherein said unstable end groups are —COOH, —CONH$_2$, —CH$_2$OH, —CO$_2$CH$_3$, —CF═CF$_2$, and —COF.

8. The process of claim 1 wherein said metal powder constitutes 0.3 to 1.2 wt % of said composition.

9. The process of claim 1 wherein said composition is a mixture of said particles of said stabilized copolymer and said metal powder.

10. Process for rotolining the steel interior surface of a hollow article, comprising, adding a composition consisting essentially of particles of fluorine treatment stabilized tetrafluoroethylene-perfluoro(alkyl vinyl ether) copolymer and adhesion-promoting, non-bubble promoting metal powder to the interior of said hollow article, said metal powder constituting no greater than about 2 wt % of said composition, rotating said article to distribute the composition over said interior surface, heating said article while it is rotating to melt said copolymer particles to form a continuous bubble-free lining comprising said copolymer and said metal powder on said interior surface, cooling said article, and obtaining as a result thereof said bubble-free lining adhering to said steel interior surface, said adhering being characterized by a peel strength of at least about 25 lb/in, said copolymer being bubble-free when subjected to said rotolining by itself, said composition being formed after the preparation of said fluorine treatment stabilized tetrafluoroethylene-perfluoro(alkyl vinyl ether) copolymer, and additionally overcoating said lining with said stabilized copolymer, said overcoating consisting of said stabilized copolymer.

11. Process of claim 10 wherein said overcoat has a thickness of at least about 2.5 mm.

12. The process of claim 10 wherein the thickness of said overcoat is at least about 4 mm.

13. The process of claim 10 wherein the thickness of said overcoat is greater than the thickness of said lining undercoat.

14. The process of claim 10 wherein the thickness of said overcoat is at least about 1.5 mm (60 mils).

15. Process for rotolining the steel interior surface of a hollow article, comprising, adding a composition consisting essentially of particles of fluorine treatment stabilized tetrafluoroethylene-perfluoro(alkyl vinyl ether) copolymer and adhesion-promoting, non-bubble promoting metal powder to the interior of said hollow article, said metal powder constituting no greater than about 2 wt % of said composition, rotating said article to distribute the composition over said interior surface, heating said article while it is rotating to melt said copolymer particles to form a continuous bubble-free lining comprising said copolymer and said metal powder on said interior surface, cooling said article, and obtaining as a result thereof said bubble-free lining adhering to said steel interior surface, said adhering being characterized by a peel strength of at least about 25 lb/in, said copolymer being bubble-free when subjected to said rotolining by itself, said composition being formed after the preparation of said fluorine treatment stabilized tetrafluoroethylene-perfluoro(alkyl vinyl ether) copolymer, and additionally overcoating said lining with tetrafluoroethylene/perfluoro(methyl vinyl ether)/perfluoro(propyl vinyl ether) copolymer having —CF$_2$H end groups to a thickness of at least 1.3 mm.

16. Composition for obtaining a bubble-free, adherent rotolining to a steel interior surface of a hollow article, said adhering being characterized by a peel strength of at least about 25 lb/in, said composition consisting essentially of particles of fluorine treatment stabilized tetrafluoroethylene/perfluoro(alkyl vinyl ether) copolymer and adhesion promoting, non-bubble promoting metal powder constituting no greater than about 2 wt % of said composition, said copolymer being bubble-free when subjected to said rotolining by itself, said composition being formed after the preparation of said fluorine treatment stabilized tetrafluoroethylene-perfluoro(alkyl vinyl ether) copolymer.

17. The composition resulting from the composition of claim 16 after melting and then cooling of said copolymer.

18. The composition of claim 16 wherein said metal powder constitutes 0.3 to 1.2 wt % of said composition.

19. The composition of claim 16 wherein said composition is a mixture of said particles of said stabilized copolymer and said metal powder.

* * * * *